United States Patent [19]

Koran et al.

[11] Patent Number: 5,185,184
[45] Date of Patent: Feb. 9, 1993

[54] PROCESS FOR PREPARING A SUBSTRATE SURFACE FOR BONDING WITH ACTIVATABLE ADHESIVES BY APPLYING AN ACTIVATOR-CONTAINING LAYER ONTO THE SUBSTRATE SURFACE

[75] Inventors: Peter Koran, Weilheim; Oswald Gasser, Seefeld; Rainer Guggenberger, Herrsching, all of Fed. Rep. of Germany

[73] Assignee: THERA Patent GmbH & Co., KG, Seefeld, Fed. Rep. of Germany

[21] Appl. No.: 662,702

[22] Filed: Mar. 1, 1991

[30] Foreign Application Priority Data

Mar. 1, 1990 [DE] Fed. Rep. of Germany ....... 4006442

[51] Int. Cl.⁵ ............................................... B05D 3/00
[52] U.S. Cl. ..................................... 427/299; 51/307; 51/308; 51/319; 51/320; 156/153; 427/322
[58] Field of Search ................. 51/307, 308, 319, 320; 156/153; 427/299, 322

[56] References Cited

U.S. PATENT DOCUMENTS 3,445,264  5/1969  Haines ................................. 427/322
5,024,711  6/1991  Gasser et al. ..................... 51/319 X

FOREIGN PATENT DOCUMENTS 0326097  8/1989  European Pat. Off. .

Primary Examiner—Michael Lusignan
Attorney, Agent, or Firm—Birch, Stewart, Kolasch & Birch

[57] ABSTRACT

In a process for the preparation of a substrate surface for the bonding thereof with an activatable adhesive, an adhesion promoter layer is applied by means of sandblasting with a sandblasting material to which an activator has been added. Optionally, said adhesion promoter layer may be subsequently silanized.

25 Claims, No Drawings

PROCESS FOR PREPARING A SUBSTRATE SURFACE FOR BONDING WITH ACTIVATABLE ADHESIVES BY APPLYING AN ACTIVATOR-CONTAINING LAYER ONTO THE SUBSTRATE SURFACE

FIELD OF THE INVENTION

The present invention relates to a process for preparing a substrate surface for the joining thereof to plastic materials, in which process an adhesion promoter layer is applied onto the substrate surface by sandblasting the substrate surface with a sandblasting material which contains both a sandblasting agent and an activator.

BACKGROUND OF THE INVENTION

U.S. Pat. No. 5,024,711 of Gasser et al discloses a method for preparing a surface for bonding with a synthetic resin. In the method, a layer is supplied onto a substrate surface by sandblasting with a composition comprising an optionally silanized material having a particle size less than 5 microns having a hardness greater than that of the substrate surface, and/or a silanized siliceous material having an average particle size of 2–200 microns, and the remainder of the sandblasting composition having an average particle size greater than 5 microns. There is not disclosed in U.S. Pat. No. 5,024,711, the use of an activator which can catalyze or accelerate the hardening of an activatable adhesive.

Adherence between substrate surfaces, e.g. made of wood, glasses, metals, ceramic or plastic materials, by means of plastic-containing adhesives or the coating of substrates with plastic materials should be permanent under even the most varied of weather conditions. Moreover, it is often desired that the adhesive strength between the substrate and a plastic piece bonded thereto, even under the most varied of stresses (such as mechanical or thermal deformations) should ideally always be stronger than the inner strength (cohesive strength) of the plastic material itself.

A process for preparing a substrate surface for bonding with plastic materials is known from EP-A-0 326 097, which is expressly incorporated herein by reference. In the process, a substrate surface is coated by sandblasting with a sandblasting material consisting of, (A) 0.01 to 90% by weight of an optionally silanized material having a particle size of <5 μm and a hardness greater than the hardness of the substrate surface, and/or (B) 20 to 100% by weight of a silanized, silicon containing material having an average particle size of 2 to 200 μm; and (C) the remainder being a sandblasting agent having an average particle size of >5 μm;

the percentages above being based upon the weight of the sandblasting material. The thus obtained adhesion-promoting layer may optionally be silanized. A similar process is also known from DE-B-38 02 043, which is also incorporated by reference herein.

The above two processes increase the adhesive strength of adhesives on substrates and the long-term stability of the bonding therebetween considerably; but they are not suitable for use with, for example, anaerobic adhesives as their polymerization and bonding can only be initiated by catalysis (e.g., metal ions) with exclusion of air. In this regard, the thin inorganic layer being applied in both of the above processes completely or largely prevents the polymerization of anaerobic adhesives. Other "activatable" adhesives, for example, cyanacrylate adhesives can also only give poor adhesion results with the aforementioned processes.

In such cases, as with other non-metallic substrate surfaces (e.g. plastic materials), the polymerization of the product can only be initiated or accelerated by applying an activator, which in the instance of anaerobic adhesives usually contain metal compounds which readily release ions (cf. G. Habenicht in "Kleben", Springer Verlag, 1986, p. 15ff, particularly p. 18).

However, the adhesive strength obtained in this way has been unsatisfactory.

SUMMARY OF THE INVENTION

An object of the present invention is to pre-treat substrate surfaces in such a way that strong adhesive bondings can be formed on the non-metallic surfaces by the use of activatable adhesives, particularly activatable anaerobic adhesives.

At the same time, it is an object of the present invention that the surface pre-treatment must result in an improved long-term resistance of the bondings formed, particularly when they are placed under difficult environmental conditions, such as increased temperatures or marked changes in temperature, atmospheric humidity and aggressive reactive materials such as acids and bases.

The above objects are achieved by adding an activator to a sandblasting agent and sandblasting (pre-treating) the substrate surface to produce an activator containing adhesion-promoting layer on the substrate surface, whereby a clearly improved adhesive strength is achieved with an activatable adhesive subsequently applied to the surface. The applied activator-containing adhesion-promoting layer is optionally silanized after the application thereof, so that the strength and long-term resistance of the bonding is even further improved. In one embodiment of the invention, an activatable, preferably an anaerobic adhesive, is applied to the pre-treated substrate surface.

The sandblasting material disclosed in EP-A-0 326 097 is preferably used as a sandblasting material herein, with an activator being added to any of the three components (A), (B), or (C) thereof.

DETAILED DESCRIPTION OF THE INVENTION

In the process according to the invention, wooden, metal, ceramic, glass or plastic materials surfaces can be used, with metal and plastic materials surfaces preferably being used.

The process according to the invention can be used in any area of application. Thus, for example, the above-mentioned cyanoacrylate adhesives can be activated according to the invention by incorporating amines or other basic substances into the sandblasting material. However, the process according to the present invention is preferably used in the area of anaerobic adhesives.

Any amount of activator can be added to the sandblasting material, for example, 0.001 to 25 % by weight activator can be used based upon the weight of the sandblasting material consisting of components (A), (B) and (C). However, preferably 0.1 to 10% by weight and particularly preferably 1 to 10% by weight activator is used based upon the weight of the sandblasting material.

The activator is preferably a metal powder and/or a powder of one or more metal salts. Particularly preferred are copper and copper salts (e.g. copper sulphate or copper procetonate (bis-(1-phenyl-1,3-pentanedionato)Cu (II)); iron and iron salts (e.g. iron sulphate). The activator can also be an amine and/or an ammonium compound and/or another basic compound.

A substrate surface pre-treated according to the process of the present invention can advantageously have applied thereto any known anaerobic adhesives suitable anaerobic adhesives are disclosed by G. Habenicht in "Kleben", Springer Verlag, 1986, page 15 ff., such as diacrylic acid esters, e.g., tetraethylene glycol dimethacrylate, tetraethylene glycol diacrylate, hexanediol diacrylate, etc. Polyfunctional acrylates can also be used (e.g. trimethylol propane triacrylate or pentaerythritol tetraacrylate), and in general, acrylic and methacrylic acid esters of mono- and polyfunctional alcohols are appropriate to utilize as activatable adhesives. To improve the adhesion of the activatable adhesive, it can also be favorable to add hydroxyfunctional acrylates such as hydroxyethyl methacrylate or hydroxypropyl methacrylate and even minor amounts of free methacrylic acids to the adhesive. There may also be added to the adhesives certain peroxidic compounds as catalyst, preferably hydroperoxides, e.g. cumene hydroperoxide, if desired.

The components (A), (B) and (C) of the preferred sandblasting materials as well as their preferred embodiments are known from EP-A-0 326 097 and DE-B-38 02 043.

As component (A), 0.01 to 90% by weight is used, based upon the weight of the sandblasting material (components (A), (B) and (C)), of an optionally silanized material with a particle size $<5$ $\mu$m and a hardness greater than that of the substrate surface, preferably 0.1 to 30% by weight, particularly of a material with a particle size $<1$ $\mu$m. It is especially preferred to use material (A) with a particle size $<0.1$ $\mu$m, "particle size" being taken here as in the following to mean the particle size of the primary particles.

The hardness of the substrate and component (A) can be established using the Mohs, Brinell, Knoop or Vickers methods, the same method necessarily being used to test the hardness of both substrate and component (A). To test the hardness of very fine material ($<1$ $\mu$m), the same material is used in coarser form. With the use according to the invention of component (A), the hardness of which is greater than that of the substrate, the adhesive strength is increased by at least 30%, preferably 50%, compared to sandblasting without component (A).

In a preferred embodiment, the material used as component (A), is silanized.

Preferably, a silicon containing material is used as component (A), particularly 0.01 to 50% by weight of optionally silanized, silicon containing material.

Especially preferred as component (A) are: quartz, quartz glass, silicate glass with at least 10% by weight of silicon, silicon carbide, silicon nitride and/or pyrogenic silicic acid; aluminum oxide, titanium dioxide and/or zirconium dioxide as well as the oxides, nitrides and/or carbides of the third and fourth main groups as well as the sub-group 4b. Such materials can have, for example, an average particle size of 10 $\mu$m, but must still contain a proportion of at least 0.01% by weight of optionally silanized material of $<5$ $\mu$m. Quite especially preferred is pyrogenic silicic acid with an average particle size of 0.001 to 0.05 $\mu$m.

The component (A) must be inert under the reaction conditions. Preferred components (A) are also inert at impact temperatures $>1000°$ C.

As component (B) there is used 20 to 100% by weight based upon the weight of the sandblasting material, of silanized, silicon containing material with an average particle size of 2 to 200 $\mu$m; 50 to 100% by weight can be preferably used with a preferred average particle size of 5 to 100 $\mu$m. As silanized silicon containing material can, for example be used, such as quartz, quartz glass, silicate glass with at least 10% by weight of silicon, silicon nitride, silicon carbide or ceramic material with at least 10% by weight of silicon. Especially preferred are quartz glass, silicate glass as well as amorphous silicon nitride. When using silicate glasses and silicon containing ceramic material, materials with a silicon content of $>30\%$ by weight are preferred.

The sandblasting agent with an average particle size of $>5$ $\mu$m to be used according to the invention as (C) is, for example, aluminum oxide (corundum). The average particle size is preferably $>5$ to 500 $\mu$m, particularly 20 to 250 $\mu$m. However, it is also advantageous to use quartz, quartz glass, silicates, silicate glasses, silicon nitride, silicon carbide or ceramic material with a silicon content.

As components (A) and/or (B), and (C), it is preferred to use materials having the same composition, but different particle sizes.

If some components of the sandblasting material are silanized, they contain preferably 0.1 to 20% by weight of silane, especially preferred 1 to 5% by weight based upon the weight of the individual components of the sandblasting material. Silanization is carried out in a manner known per se, e.g. as is used in filler technology. All commonly used silanes are suitable for preparing the sandblasting components used according to the invention; especially suitable are vinyl trimethoxy silane, gamma-glycidoxy-propyl trimethoxy silane, gamma-methacroyloxypropyl trimethoxy silane and tetramethyl divinyl silazane. The compounds are preferably used in the form of alcoholic or aqueous acidic—e.g. acetic—solution.

Silanization of the applied silicon-containing adhesion-promoting layer is carried out in a manner known per se. Preferably used silanes are vinyl trimethoxy silane, gamma-glycidoxypropyl trimethoxy silane, gamma-methacroyloxypropyl trimethoxy silane and tetramethyl divinyl silazane. The compounds are preferably used in the form of alcoholic or aqueous acidic—e.g. acetic—solution.

It has proved to be especially advantageous, both in the silanization of components of the sandblasting material and the silanization of the surface treated according to the invention in each case to use silanes with the same functional groups as are also present in the monomer of the plastic materials, e.g. of the adhesive. Thus, for example, in order to bond metals with epoxy resins, silanes with epoxy terminal groups are advantageously used.

The invention is further illustrated by the following examples in which it is shown, with reference to model tests, that the process according to the invention leads to a surprisingly high level of adhesive strength.

EXAMPLES

Anaerobic Bonding of Polypropylene

The effect of the process is shown in the bonding of polypropylene. Test specimens made of polypropylene with the dimensions 60 mm×25 mm×6 mm were bonded. Single cross section overlapped tensile shearing specimens were prepared with an overlap length of 12 mm and a defined adhesion gap of 0.2 mm, which was defined by means of spacers (adhesive DELO ML 187—adhesive based on dimethacrylate).

The pre-treatment process consisted of:
(a) Sandblasting with a 110-$\mu$ special fused alumina (Edelkorund).
(b) Sandblasting with the sandblasting material described in (a) and subsequent application of a commercial activator for anaerobic adhesives (Aktivator No. 2 from DELO—activator based on copper).
(c) Sandblasting with a sandblasting agent described in Example 18 of DE-B-38 02 043 based on a special fused alumina (Edelkorund) with addition of 1% copper powder (1% by weight unsilanized pyrogenic silicic acid with an average particle size of approximately 0.04 $\mu$m, 99% by weight $Al_2O_3$ with an average particle size of approximately 110 $\mu$m and 1% by weight of copper powder).
(d) Sandblasting with the sandblasting material described in (c) and subsequent application of an acryl functional adhesion promoter (gamma-methacryloxypropyl trimethoxy silane).

| Pre-Treatment | Tensile Shear Strength N/mm$^2$ |
|---|---|
| (a) | 0 |
| (b) | 0.37 |
| (c) | 1.12 |
| (d) | 2.75 |

Remarks: Pre-treatment (a) showed incomplete curing.

As may be seen from the above results, in the case of the plastic material specimens, which were only sandblasted (pre-treatment (a)), there was obtained zero (0) adhesive strength, because in this case the catalytic effect of metal ions was missing. Moreover, roughening the surface by means of a sandblasting process in pre-treatment (b) with the subsequent application of an activator containing a copper sulphate solution, achieved only low adhesive strengths. In this regard, even though the adhesive was solidly polymerized, measurement results showed an adhesive strength of only 0.37 N/mm$^2$.

On the other hand, in pre-treatment (c), by using a 1% copper powder addition in the sandblasting agent, it was possible to incorporate metals into the surface so firmly that a considerably higher adhesive strength was achieved (1.12 N/mm$^2$); and moreover, this was further increased (to 2.75 N/mm$^2$) after pre-treatment (d) by using a suitable acrylfunctional adhesion promoter (Silans). Pre-treatments (c) and (d) are encompassed by the present invention.

2. Ageing Tests on Anaerobically Bonded Polypropylene Test Specimens

Test specimens were prepared as described in Example 1. However, the adhesive DELO ML 118 (an adhesive based on dimethacrylate) was used.

The ageing resistance of the bondings was tested by ageing the same for one or two months in a salt spray mist at 40° C. and then in 70° C. hot distilled water.

The following table shows the tensile shear strengths achieved. The description of the pretreatment method is as in Example 1.

| Pre-Treatment | Tensile Shear N/mm$^2$ Strengths | | | | |
|---|---|---|---|---|---|
| | Initial Value | Salt-Spray Test | | Water Storage | |
| | | 1 mo. | 2 mos. | 1 mo. | 2 mos. |
| (a) | 0 | — | — | — | — |
| (b) | 0.5 | 0 | 0 | 0 | 0 |
| (d) | 4.8 | 5.8 | 6.3 | 5.1 | 5.4 |

Remarks: (a) and (b) showed incomplete curing.

Only the joint parts (d) pre-treated according to the present invention still display high strength values after the ageing. The values even increase further because of the secondary cross-linking of the adhesives.

3. Anaerobic Bonding of Aluminum

The bondings were carried out on the aluminum alloy $AlMgSi_{0.5}$.

For the purposes of a tensile shearing test, test specimens of the dimensions 60 mm×25 mm×1.6 mm were bonded to single cross section overlapped tensile shearing specimens with an overlap length of 12 mm and a defined adhesion gap of 0.2 mm.

| Pre-Treatment | Tensile Shear Strengths N/mm$^2$ |
|---|---|
| (a) | 7.4 |
| (b) | 9.8 |
| (c) | 13.3 |
| (d) | 14.5 |

Remark: Pre-treatment (a) showed incomplete curing.

The above methods of pre-treatment are as described in Example 1. Again, the simple roughening of the surface in pre-treatment (a) led only to a low adhesive strength value (7.4 N/mm$^2$), which is due to the fact that the adhesive was not fully cured even after 24 hours. This was improved by application of an activator (pre-treatment (b)), whereby a complete curing of the adhesive layer occurred. However, the full potential of the adhesive bonding still was not obtained, as is shown by the better results obtained with pre-treatments (c) and (d) of the present invention.

The present invention thus being described, the same is not to be construed as limited by the specific Examples and embodiments disclosed herein. Instead, the present invention is only limited by the scope of the claims appended hereto and the equivalents thereof.

What is claimed is:

1. In a process for preparing a substrate surface for the bonding thereto of a plastic material, in which process an adhesion-promoting layer is applied to the substrate surface by sandblasting the substrate surface with a sandblasting material, the improvement comprising:
    adding an activator to the sandblasting material, which activator can catalyze or accelerate the hardening of an activatable adhesive.

2. In the process according to claim 1, the sand-blasting material comprising in addition to the activator which can catalyze or accelerate the hardening of an activatable adhesive, the following, based upon the weight of the sandblasting material:

(A) 0.01 to 90% by weight of an optionally silanized material having a particle size of <5 μm and a hardness greater than that of the substrate surface, and/or (B) 20 to 100% by weight of a silanized, silicon-containing material having an average particle size of 2 to 200 μm; and (C) the remainder of the sandblasting material being a sandblasting agent having an average particle size >5 μm.

3. In the process according to claim 1, the sandblasting material comprising in addition to the activator which can catalyze or accelerate the hardening of an activatable adhesive, the following, based upon the weight of the sandblasting material:

(B) 20 to 100% by weight of a silanized, silicon-containing material having an average particle size of 2 to 200 μm; and (C) the remainder of the sandblasting material being a sandblasting agent having an average particle size >5 μm.

4. In the process according to claim 1, the sandblasting material comprising in addition to the activator which can catalyze or accelerate the hardening of an activatable adhesive, the following, based upon the weight of the sandblasting material:

(A) 0.01 to 90% by weight of an optionally silanized material having a particle size of <5 μm and a hardness greater than that of the substrate surface; and (C) the remainder of the sandblasting material being a sandblasting agent having an average particle size >5 μm.

5. In the process according to claim 1, the step of adding 0.001 to 25% by weight of the activator to the sandblasting material, based upon the weight of the sandblasting material.

6. In the process according to claim 3, the step of adding 0.001 to 25% by weight of the activator to the sandblasting material, based upon the weight of the sandblasting material.

7. In the process according to claim 4, the step of adding 0.001 to 25% by weight of the activator to the sandblasting material, based upon the weight of the sandblasting agent (C).

8. In the process according to claim 1, the activator comprising a metal powder or a powder of one or more metal salts.

9. In the process according to claim 3, the activator comprising a metal powder or a powder of one or more metal salts.

10. In the process according to claim 4, the activator comprising a metal powder or a powder of one or more metal salts.

11. In the process according to claim 1, the activator comprising an amine or an ammonium compound or another basic compound.

12. In the process according to claim 3, the activator comprising an amine or an ammonium compound or another basic compound.

13. In the process according to claim 4, the activator comprising an amine or an ammonium compound or another basic compound.

14. In the process according to claim 1, the further step of applying an activatable adhesive to the substrate surface, after the sandblasting of the surface.

15. In the process according to claim 3, the further step of applying an activatable adhesive to the substrate surface, after the sandblasting of the surface.

16. In the process according to claim 4, the further step of applying an activatable adhesive to the substrate surface, after the sandblasting of the surface.

17. In the process of claim 3, the further step of applying an activatable anaerobic adhesive to the substrate surface, after the sandblasting of the surface.

18. In the process of claim 4, the further step of applying an activatable anaerobic adhesive to the substrate surface, after the sandblasting of the surface.

19. A sandblasting material comprising, based upon the weight of components (A), (B) and (C):

(A) 0.01 to 90% by weight of an optionally silanized material with a particle size of <5 μm and a hardness greater than that of the substrate surface, and/or (B) 20 to 100% by weight of a silanized, silicon containing material with an average particle size of 2 to 200 μm;

(C) the remainder being a sandblasting agent with an average particle size of >5 μm, and in addition, based upon 100% by weight of components (A), (B) and (C):

(D) 0.001 to 25% by weight of an activator which can catalyze or accelerate the hardening of an activatable adhesive.

20. A sandblasting material comprising, based upon the weight of components (B) and (C):

(B) 20 to 100% by weight of a silanized, silicon containing material with an average particle size of 2 to 200 μm;

(C) the remainder being a sandblasting agent with an average particle size of >5 μm, and in addition, based upon 100% by weight of components (B) and (C):

(D) 0.001 to 25% by weight of an activator which can catalyze or accelerate the hardening of an activatable adhesive.

21. A sandblasting material comprising, based upon the weight of components (A) and (C):

(A) 0.001 to 90% by weight of an optionally silanized material with a particle size of less than 5 μm in a hardness greater than that of the substrate surface, (C) the remainder being a sandblasting agent with an average particle size of greater than 5 μm, and in addition, based upon 100% by weight of components (A) and (C):

(D) 0.001 to 25% by weight of an activator which can catalyze or accelerate the hardening of activatable adhesive.

22. In the process of claim 1, the activator comprising a metal powder or a powder of a metal salt, selected from the group consisting of copper, copper sulfate, copper procetonate, iron and iron sulfate.

23. A sandblasting material as recited in claim 19, wherein the activator which can catalyze or accelerate the hardening of an activatable adhesive is selected from the group consisting of copper, copper sulfate, copper procetonate, iron and iron sulfate.

24. A sandblasting material as recited in claim 20, wherein the activator which can catalyze or accelerate the hardening of an activatable adhesive is selected from the group consisting of copper, copper sulfate, copper procetonate, iron and iron sulfate.

25. A sandblasting material as recited in claim 21, wherein the activator which can catalyze or accelerate the hardening of an activatable adhesive is selected from the group consisting of copper, copper sulfate, copper procetonate, iron and iron sulfate.

* * * * *